United States Patent Office 3,334,158
Patented Aug. 1, 1967

3,334,158
PROCESS FOR THE PREPARATION OF ALKENYL PHOSPHATES FROM ALKENYL PHOSPHITES
James J. Hodan, Tonawanda, and Charles F. Baranauckas, Niagara Falls, N.Y., assignors to Hooker Chemical Corporation, Niagara Falls, N.Y., a corporation of New York
No Drawing. Filed Aug. 16, 1963, Ser. No. 302,730
17 Claims. (Cl. 260—985)

This invention relates to a process for the preparation of organic phosphates. More particularly, it relates to the preparation of esters of phosphoric acid having the formula:

(1) 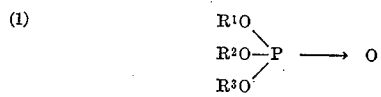

where $R^1$ has the formula (2) 

wherein $R^4$ is selected from the group consisting of hydrogen and an alkyl having from 1 to about 6 carbon atoms, $R^5$ and $R^6$ are selected from the group consisting of hydrogen, halogen, and an alkyl having from 1 to about 6 carbon atoms, and $R^2$ and $R^3$ are selected from the group consisting of $R^1$, normal alkyl having from 1 to about 20 carbon atoms, cycloalkyl having from about 4 to 20 carbon atoms, branched alkyl having between 1 to 20 carbon atoms, substituted alkyl having between 1 to 20 carbon atoms, aryl having from 6 to about 20 carbon atoms, substituted aryl having from 6 to about 20 carbon atoms and mixtures thereof.

There are numerous methods of preparing trialkyl or triaryl phosphates. However, most of these methods have proven to be commercially unsatisfactory in the preparation of phosphates of Formula 1. This is due to the formation of undesirable by-products. The good results obtained by the process of the invention are surprising because of the tendency of alkenyl phosphates and their corresponding phosphites, such as triallyl phosphate and triallyl phosphite, to undergo uncontrollable polymerization and copolymerization when heated to a temperature above about 100 degrees centigrade. It has been found that alkenyl esters of phosphoric acid may be prepared in substantially quantitative yields by passing a phosphite of the general formula:

(3) 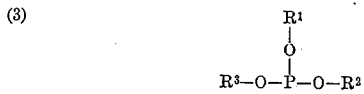

wherein $R^1$, $R^2$ and $R^3$ are as hereinabove described, into a reaction zone, contacting said phosphite with an oxygen carrying gas, whereby the corresponding phosphate is formed, and continuously removing the phosphate from the reaction zone in a substantially quantitative yield. The reactants and the reaction product of the process have a short residence time within the reaction zone which is maintained at a temperature above 100 degrees centigrade. The formation of undesirable by-products and the polymerization and copolymerization of the reactants and reaction product are held to a minimum. Good results are obtained if the reactants and reaction product have a residence time in the reaction zone up to about twenty minutes and sufficient to effect the reaction, with better results being obtained if the residence time is maintained between about 0.5 second and fifteen minutes and best yields and qualities resulting with residence times between about 0.5 second and five minutes.

The triesters of phosphorous acid which are utilized in this process to form the corresponding triester of phosphoric acid by oxidation should have at least one allylic unsaturated double bond.

Typical examples of the phosphites which may be utilized in the invention include triallyl phosphite, trimethallyl phosphite, tris (2-chloroallyl)phosphite, tris(2-bromoallyl)phosphite, tris(2-fluoroallyl)phosphite, tricrotyl phosphite, tris(3-chloroallyl)phosphite, tris(3-chloromethallyl)phosphite and mixtures thereof. In practicing the process of this invention the corresponding phosphates are obtained, such as, triallyl phosphate, trimethallyl phosphate, tris(2-chloroallyl)phosphate, tris(2-bromoallyl)phosphate, tris(2-fluoroallyl)phosphate, tricrotyl phosphate, tris(3-chloroallyl)phosphate, tris(3-chloromethallyl)phosphate, trimethallyl phosphate, and mixtures thereof. In the practice of this invention, it is also possible to use mixed alkenyl phosphites such as diallyl monomethallyl phosphite to form the corresponding diallyl monomethallyl phosphate.

Dimethyl allyl phosphite
Diethyl allyl phosphite
Dipropyl allyl phosphite
Dibutyl allyl phosphite
Diamyl allyl phosphite
Dihexyl allyl phosphite
Diheptyl allyl phosphite
Dioctyl allyl phosphite
Dinonyl allyl phosphite
Didecyl allyl phosphite
Dilauryl allyl phosphite
Dimyristyl allyl phosphite
Dicetyl allyl phosphite
Distearyl allyl phosphite
Dimethyl 2-chloroallyl phosphite
Dihexyl 2-bromoallyl phosphite
Didecyl 3-bromoallyl phosphite
Diallyl methyl phosphite
Diallyl ethyl phosphite
Diallyl propyl phosphite
Diallyl butyl phosphite
Diallyl amyl phosphite
Diallyl hexyl phosphite
Diallyl heptyl phosphite
Diallyl octyl phosphite
Diallyl nonyl phosphite
Diallyl decyl phosphite
Diallyl lauryl phosphite
Diallyl myristyl phosphite
Diallyl cetyl phosphite
Diallyl stearyl phosphite
Di-(2-chloroallyl)methyl phosphite
Di-(2-iodoallyl)hexyl phosphite
Cyclohexyl diallyl phosphite
Di-(2,4-dichlorophenyl)-allyl phosphite
Tris(3-hexyl allyl)phosphite
Dimethyl methallyl phosphite
Diethyl methallyl phosphite
Dipropyl methallyl phosphite
Dibutyl methallyl phosphite
Diamyl methallyl phosphite
Dihexyl methallyl phosphite
Diheptyl methallyl phosphite
Dioctyl methallyl phosphite
Dinonyl methallyl phosphite
Didecyl methallyl phosphite
Dilauryl methallyl phosphite
Dimyristyl methallyl phosphite
Dicetyl methallyl phosphite
Distearyl methallyl phosphite
Dimethallyl methyl phosphite
Dimethallyl ethyl phosphite Dimethallyl propyl phosphite
Dimethallyl butyl phosphite
Dimethallyl amyl phosphite
Dimethallyl hexyl phosphite
Dimethallyl heptyl phosphite
Dimethallyl octyl phosphite
Dimethallyl nonyl phosphite
Dimethallyl decyl phosphite
Dimethallyl lauryl phosphite
Dimethallyl myristyl phosphite
Dimethallyl cetyl phosphite
Dimethallyl stearyl phosphite
Phenyl-di-(2-chloroallyl)phosphite
Napthyl-di-(2-bromoallyl)phosphite
Diphenyl allyl phosphite
Dibenzyl allyl phosphite
Dinapthyl allyl phosphite
Diphenyl methallyl phosphite
Diphenyl 2-chloroallyl phosphite
Diphenyl 3-iodioallyl phosphite
Dibenzyl 2-chloroallyl phosphite isomers thereof and so forth.

Therefore, the triesters of phosphorous acid which may be utilized, of which the above are illustrative, include dialkenyl phosphites, monoaryl bis(halosubstituted-alkenyl)phosphites, diaryl monoalkenyl phosphites, diaryl mono(halo-substituted alkenyl)phosphites, monoalkyl dialkenyl phosphites, monoalkyl bis(halo-substituted-alkenyl)phosphites, dialkyl monoalkenyl phosphites, and dialkyl mono(halo-substituted alkenyl)phosphites.

In practicing the invention, the phosphite is fed to a reaction zone maintained at a suitable temperature in which oxygen is present generally as a component of a gas mixture.

The phosphite is passed into the zone, which may be a reaction column, at a rate of flow such that the phosphate product is removed at essentially the same rate as the phosphite is being passed into the column. The oxygen-containing gas mixture which also is continuously fed into the reaction zone may be air or oxygen in the presence of a carrier gas, e.g., nitrogen, argon, etc. The amount of oxygen in the carrier gas may vary from about 10 to about 60 percent. However, suitable results are obtained when oxygen is present in the gas mixture in an amount equal to from about 20 to about 50 percent, with the preferred percentage of oxygen in the gas mixture being between about 10 and 30 percent. An increased amount of oxygen in the carrier gas also may be utilized, however, best results are obtained with the ratios set forth above as uncontrollable polymerization and copolymerization are easily avoided. It is preferred to pass the oxygen carrying gas into the reaction zone continuously so that it first contacts a reaction mixture containing a minor proportion of the phosphite, less than about 90 percent, and then proceeds to flow through said zone to contact subsequently a reaction mixture containing a major proportion of said phosphite better than 90 percent. A steady increasing rate of oxidation thus occurs as the phosphite passes countercurrent to oxygen through the reaction zone. The process of this invention may also be carried out by passing the oxygen carrying gas and phosphite concurrently into the reaction zone in such a manner that the greatest amount of oxidation takes place initially on adding the phosphite to the reaction zone and allowing the oxidation to proceed as the phosphite passes through the zone and is delivered as a phosphate at the terminus of the reaction zone. It is to be understood that vapors which may leave the reaction zone may be condensed and recycled or otherwise passed back into the reaction zone for a more economical and beneficial operation of the process. It is further preferred that the air or other oxygen carrying gas be dried by known means before it is utilized in this process. By following the procedure herein described it was found that only a minor amount, less than about four percent of undesirable by-products were present in the phosphate produced.

A reaction zone or column which present a high surface area per unit volume should preferably be utilized. To accomplish this, the zone may be packed with Berl Saddles, Raschig rings, glass Helices or protruding stainless steel packing, alumina and nickel Goodloe packing or other materials of high surface volume ratios to provide contact surfaces for the reactants.

It has been found that when the reaction zone is maintained at a temperature above 100 degrees centigrade, good results and high yields are obtained. However, it is preferred to carry out the reaction within the range of between about 120 and 205 degrees centigrade, with best results being obtained between 130 and 190 degrees centigrade. Heating or cooling of the system may be effected by suitable means which will maintain the reaction zone substantially at a constant desired temperature, preferably constant throughout the reaction zone. The amount of oxygen carrying gas that should be utilized in the reaction to yield favorable results is about a stoichiometric amount. However, it is preferred to utilize excess of between about 100 and 1000 percent of the stoichiometric amount, with more favorable results being achieved when the reaction is carried out under conditions wherein an excess of oxygen between about 300 and 800 percent is utilized. Under the conditions of this reaction, there is only a small retention time as indicated above. Because of the high purity of the phosphates produced in accordance with the instant novel process, the products are suitable for use in the preparation of polymers, telomers, and copolymers without further distillation.

The following examples are presented to describe the invention more fully without any intent of being limited thereby. All parts and percentages are by volume unless otherwise specified. All degrees are in degrees centigrade unless otherwise specified.

*Example I*

At a rate of 1.5 parts per minute air was passed into a reaction zone heated to 140 degrees centigrade and packed with protruded stainless steel. Liquid triallyl phosphite (98.4 percent pure) was simultaneously passed into this reaction zone at a rate of 0.001 part per minute in such a manner that it was gradually subjected to an increased concentration of air. A sample of the product was collected in a collection vessel as the liquid flowed from the reaction zone and was analyzed for percent triallyl phosphite by iodine titration which indicated that 99.9 percent of the product recovered was triallyl phosphate. Retention time of the reactants in the reaction zone was about 50 seconds.

This example illustrates the outstanding yield of triallyl phosphate obtainable by the practice of this invention.

*Example II*

Example I was repeated, except for the reaction zone being now maintained at 60 degrees centigrade, while air and triallyl phosphite were passed therethrough, countercurrent, to each other. Analysis of a sample of the product by iodine titration for phosphite indicated that 59.4 percent of the recovered product was triallyl phosphate. Retention time of the reactants in the reaction zone was 11 seconds.

*Example III*

Example I was repeated passing air at a rate of 9 parts per minute in a countercurrent flow of triallyl phosphite entering a reaction zone maintained at 130 degrees centigrade at a rate of 0.01 part per minute. The product which continuously flowed from the reaction zone was analyzed for phosphite content by titration with iodine. This analysis indicated that 99.9 percent triallyl phosphate was present in the end product. This example indicates that a substantially quantitative amount of triallyl phosphate was prepared by the process of the process of the invention described hereinabove. Retention time of the reactants in this example was 9 seconds.

Example IV

Triallyl phosphite (91.9 percent pure) was added into a reaction zone maintained at a temperature about 140 degrees centigrade and packed with protruded stainless steel. At a rate of 0.01 part per minute an air and nitrogen mixture was passed into the reaction zone simultaneously with the phosphite in such a manner that it first contacted a minor proportion of the phosphite (less than 20%) and then proceeded to flow through the reaction zone countercurrent with the phosphite to contact a major proportion of said phosphite above 80 percent. A sample of the product obtained from a terminus of the reaction zone was analyzed by iodine titrationa and indicated that 99.8 percent of the product was triallyl phosphate. The carrier gas contained 50 percent air and 50 percent nitrogen.

Example V

Example I was repeated except that the temperature in the reaction zone was held at about 130 degrees centigrade and the flows of air and phosphite were 26.7 parts per minute and 0.02 part respectively. Triallyl phosphate was recovered in 99.4 percent yield as evidenced by iodine titration.

Example I, repeated with trimethallyl phosphite, tris(2-chloroallyl) phosphite, tricrotyl phosphite, distearyl allyl phosphite, naphthyl-di-(2-bromoallyl)phosphite, diphenylallyl phosphite, diphenyl 2-chloroallyl phosphite, and dibenzyl 2-chloroallyl phosphite results in similar yields of the corresponding phosphates.

Examples VI to XI

Following the procedure of Example I phosphites as set forth in Table I were oxidized to their corresponding phosphates.

where $R^4$ is selected from the group consisting of hydrogen and an alkyl, $R^5$ and $R^6$ are selected from the group consisting of hydrogen, halogen, and an alkyl, and $R^2$ and $R^3$ are selected from the group consisting of $R^1$, alkyl, cycloalkyl, branched alkyl, phenyl, naphthyl, alkylphenyl, phenylalkyl, and mixtures thereof comprising passing a phosphite having the formula

where $R^1$, $R^2$ and $R^3$ are as described above into a reaction zone maintained at a temperature above 130 degrees centigrade, contacting said phosphite with a gaseous mixture containing oxygen within the reaction zone for less than 20 minutes, whereby the corresponding ester of phosphoric acid is formed, and removing the ester of phosphoric acid from the reaction zone.

2. A process for preparing esters of phosphoric acid having the formula

where $R^1$ has the formula

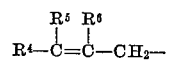

where $R^5$ and $R^6$ are selected from the group consisting of hydrogen, halogen, and an alkyl having from 1 to about 6 carbon atoms, and $R^4$ is selected from the group consisting of hydrogen and an alkyl having from 1 to about 6 carbon atoms, and $R^2$ and $R^3$ are selected from the group consisting of $R^1$, alkyl having from 1 to about 20 carbon atoms, cycloalkyl having from about 4 to 6 carbon atoms, branched alkyl having between 1 to 20 carbon atoms, phenyl, naphthyl, alkylphenyl, phenyl-

TABLE I

| Phosphite | Phosphite analysis (percent) | Condition of Reaction zone | | Air Flow (pts./min.) Excess of Oxygen (percent) | Phosphate Anal. Percent | Retention Time |
| --- | --- | --- | --- | --- | --- | --- |
| | | Temp., °C. | Rate of addition of phosphine (pts./min.) | | | |
| Diallyl methyl | 100 | 120–130 | 0.004–0.005 | 9.7 (600%) | 74.7 | 11 |
| Diallyl ethyl | 95.8 | 121 | 0.004–0.005 | 8.6 (600%) | 60.8 | |
| Dimethyl allyl | 96.8 | 140 | 0.004–0.005 | 11.5 (600%) | 98.3 | 9.5 |
| Dially phenyl | 73.0 | 140–154 | 0.004–0.005 | 7.6 (600%) | 40.3 | |
| Dimethallyl ethyl | 97.2 | 140–148 | 0.004–0.005 | 7.3 (600%) | 74.3 | |
| Dimethallyl cresyl | 87.3 | 140–155 | 0.004–0.005 | 6.1 (600%) | 22.0 | |

The results obtained, as seen from Table I, establish that the mixed phosphites are readily oxidized in this process to their corresponding phosphates.

It will be recognized by those skilled in the art that various modifications within the invention are possible, some of which have been referred to above. Therefore, the invention is not to be construed as limited, except as defined by the appended claims.

What is claimed is:

1. A process for preparing esters of phosphoric acid having the formula:

where $R^1$ has the formula

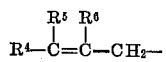

alkyl, and mixtures thereof, comprising passing a phosphite having the formula

where $R^1$, $R^2$, and $R^3$ are as described above continuously into a reaction zone maintained at a temperature between about 130 and 205 degrees centigrade, continuously contacting said phosphite with a gaseous mixture containing oxygen by passing said gaseous mixture countercurrently through the phosphite within the reaction zone for less than 20 minutes whereby the corresponding ester of phosphoric acid is formed, and continuously removing the ester of phosphoric acid from the reaction zone.

3. A process in accordance with claim 2 wherein less than 60 percent of the gaseous mixture is oxygen.

4. A process in accordance with claim 2 wherein the phosphite has one to three [ethenically unsaturated double bonds, nor more than one such double bond] being present in each esterifying group, and any esterifying group containing such double bond having three to four carbon atoms.

5. A process in accordance with claim 2 wherein said phosphite is triallyl phosphite.

6. A process in accordance with claim 3 wherein said phosphite is triallyl phosphite.

7. A process in accordance with claim 4 wherein said phosphite is triallyl phosphite.

8. A process in accordance with claim 2 wherein the phosphite is diallyl methyl phosphite.

9. A process in accordance with claim 2 wherein the phosphite is diallyl ethyl phosphite.

10. A process in accordance with claim 2 wherein the phosphite is dimethyl allyl phosphite.

11. A process in accordance with claim 2 wherein the phosphite is diallyl phenyl phosphite.

12. A process in accordance with claim 2 wherein the phosphite is dimethallyl ethyl phosphite.

13. A process in accordance with claim 2 wherein the phosphite is dimethallyl cresyl phosphite.

14. A process in accordance with claim 2 wherein the phosphite and the gaseous mixture containing oxygen are passed into the reaction zone, so that the gaseous mixture containing oxygen first contacts a major proportion of the ester of phosphoric acid and then proceeds to flow through said reaction zone to contact a minor proportion of the ester of phosphoric acid whereby a substantially quantitative amount of said phosphate is obtained.

15. A process in accordance with claim 14 wherein the phosphite is triallyl phosphite.

16. A process for preparing triallyl phosphate which comprises passing triallyl phosphite through a reaction zone maintained at a temperature from about 130 degrees centigrade to about 190 degrees centigrade, in countercurrent flow with an oxygen-containing gas so that the reactants remain in the reaction zone from 0.5 second to about 5 minutes.

17. A process in accordance with claim 16 wherein the oxygen-containing gas contains from 40 to 90 percent of a carrier gas.

References Cited

UNITED STATES PATENTS

| 3,042,697 | 7/1962 | Halter et al. | 260—976 X |
| 3,136,804 | 6/1964 | Hodan et al. | 260—985 |

OTHER REFERENCES

Fox et al.: "The Chemistry of Organo-Phosphorus Compounds," (1948) page 62.

CHARLES B. PARKER, *Primary Examiner.*

FRANK M. SIKORA, BERNARD BILLIAN,
*Assistant Examiners.*

UNITED STATES PATENT OFFICE
CERTIFICATE OF CORRECTION

Patent No. 3,334,158                                  August 1, 1967

James J. Hodan et al.

It is hereby certified that error appears in the above numbered patent requiring correction and that the said Letters Patent should read as corrected below.

Column 1, line 61, for "undersirable" read -- undesirable --; column 2, line 19, after "phosphate." insert -- Other examples of mixed phosphites are: --; column 3, line 20, for "iodioallyl" read -- iodoallyl --; column 4, line 38, for "degrees", first occurrence, read -- temperatures --; column 5, line 2, strike out "of the process"; line 17, for "titrationa" read -- titration --; columns 5 and 6, TABLE I, first column, line 4 thereof, for "Dially phenyl" read -- Diallyl phenyl --; column 6, line 75, for "[ethenically unsaturated" read -- ethylenically unsaturated --; column 7, line 1, for "nor more than one such double bond]" read -- no more than one such double bond --.

Signed and sealed this 24th day of June 1969.

(SEAL)
Attest:

EDWARD M. FLETCHER, JR.                         WILLIAM E. SCHUYLER, JR.
Attesting Officer                                    Commissioner of Patents